Jan. 22, 1952   R. N. WATTS ET AL   2,583,452
MANUFACTURE OF HOLLOW MAGNETITE BEAD CATALYST
Original Filed Nov. 27, 1946
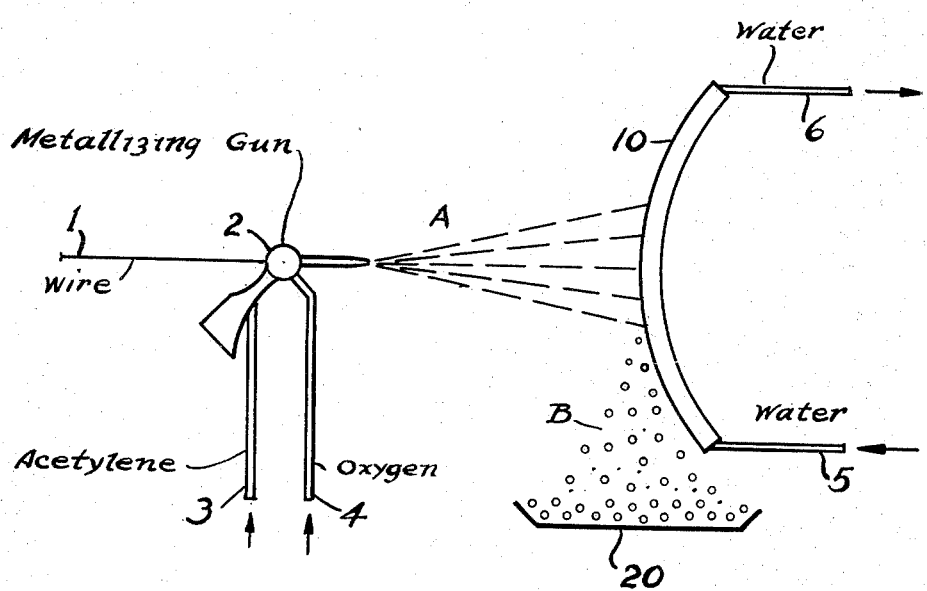
Rhea N. Watts
William E. Spicer Inventors
By J. Cushman Attorney.

Patented Jan. 22, 1952

2,583,452

UNITED STATES PATENT OFFICE 2,583,452

MANUFACTURE OF HOLLOW MAGNETITE BEAD CATALYST

Rhea N. Watts and William E. Spicer, Baton Rouge, La., assignors to Standard Oil Development Company, a corporation of Delaware Original application November 27, 1946, Serial No. 712,622. Divided and this application December 31, 1947, Serial No. 794,980

2 Claims. (Cl. 252—474)

The present application is a division of our abandoned copending application Serial No. 712,622 filed November 27, 1946.

The present invention is concerned with improved catalysts. The invention is more particularly concerned with an improved catalyst comprising iron, suitable for use in hydrocarbon synthesis operations. In accordance with a specific adaptation of the present process an iron catalyst, the structure of which comprises hollow microspheres, is prepared from iron wire employing a metallizing gun.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of sodium, potassium, chromium, zinc, aluminum, magnesium and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalyst, character of the feed gases and the temperature utilized. Pressures in the range from about 1 to 100, and higher, atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, a mol ratio of 1/1 to 4/1 of hydrogen to carbon monoxide in the feed synthesis gases is desirable.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using steam and carbon dioxide for the production of carbon monoxide and hydrogen. When employing methane as feed gas and reducing the same with a reducible metal oxide, the reactions are generally conducted at temperatures in the range from about 1400° F. to about 2000° F. When the synthesis gases are produced, by utilizing oxygen and natural gas, the temperatures in the reaction zone are usually in the range from about 2000 to about 3000° F.

It is also known in the art to contact gases and solids by passing the gases upwardly through an enlarged treating zone, containing a body of finely-divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In fluidized operations, the solid subdivided particles generally have particle sizes in the range from about 0 to 200 microns and higher. These particles are maintained in a fluid ebullient state in the reaction zone by means of upflowing suspending gases, the velocity of which is in the range from about 0.1 to 5 feet and higher per second.

Our invention finds specific application in a hydrocarbon synthesis reaction wherein the synthesis gases are reacted by means of a suitable catalyst to form hydrocarbon constituents containing more than one carbon atom in the molecule. For example, in this process one of the important problems confronting the development of the synthesis process is that carbon builds up on the catalyst to an extent that it is lost unless it is regenerated. Although a certain amount of carbon may be desirable on the catalyst surface, this factor must be controlled. As the carbon accumulates on the catalyst it disintegrates into finer particles. For example, catalyst containing no 0–20 micron material and 75% of 80+ micron fraction will be altered in 200 hours to 50% of 0–20 micron material and 10% of 80+ material. The finer material contained the most carbon, 50% as compared to 20% for the coarse particles. One main detrimental effect of carbon formation on the catalyst is the lower heat transfer property which results. This produces an attendant difficulty in maintaining satisfactory temperature control throughout the reactor bed. Thus, hot spots develop in the catalyst bed due to the poor heat transfer conditions. In accordance with our process, we, therefore, are able to effectively control the character of the product gases and vapors by controlling the carbon content of the catalyst in the treating zone.

In accordance with our invention, we prepare catalysts which are less subject to attrition due to carbonization. By employing our catalysts, a more uniform product is secured for a longer period of time. Our catalysts comprise hollow microspheres selected from the group consisting of iron, cobalt or nickel. These hollow microsphere catalysts may contain suitable promoters of the class enumerated heretofore. Particularly desirable promoters comprise sodium carbonate and/or potassium carbonate. In accordance with our invention, our hollow microspheres are prepared by employing metallic wire in conjunction with a metallizing gun. Our invention may be readily understood by referring to the drawing illustrating one modification of the same.

Referring specifically to the drawing, iron wire 1 is introduced into metallizing gun 2. Fuel, as for example acetylene and oxygen, is supplied to the metallizing gun 2 by means of lines 3 and 4, respectively. The iron wire is projected through zone A and impinged against a curved baffle zone 10. For the purpose of description, curved baffle zone is positioned approximately six feet from the nozzle of metallizing gun 2. Cooled water or an equivalent cooling medium is introduced into zone 10 by means of line 5 and withdrawn from zone 10 by means of line 6. The temperature of the cooling zone 10 is maintained at about 200° F. The metal impinging upon the surface of baffle 10 is broken up into small particles, which particles fall downwardly through zone B and are collected in collecting means 20.

Our invention comprises the production of metallic microspheres, particularly from the metals of the group consisting of iron, cobalt and nickel, by utilizing metal wire or metal rod, or equivalent, in conjunction with a metallizing gun. The melted metal is sprayed upon the surface of a baffle under conditions to break up the semi-solidified metal into small particles. These particles are then allowed to fall through an area and are collected in a collecting means.

Any type of metallizing gun or equivalent means may be utilized. The particular metallizing gun used in conjunction with our work is a metallizing gun, designated by the trade name "Metco Metallizing Gun," manufactured by the Metallizing Engineering Company, Inc., of Long Island City, New York. The particular type of metal wire or rod employed should preferably be pure metal. Carbon steels are very satisfactory.

The temperature in the zone between baffle and the metallizing gun is generally in the range from about 2000° F. to 4000° F. In general, the baffle is positioned away from the gun so as to place the baffle in an oxidizing atmosphere. The molten metal should be impinged upon the baffle while hot, under conditions to break the metal into particles having a micron size in the range from about 5 to 100 microns. The temperature on the surface of the baffle should preferably be in the range from about 100 to 300° F., preferably at a temperature of about 200° F. It is our belief that the temperature of the molten metal as it impinges upon the surface of the baffle is about 3000° F.

The process of our invention may be readily understood by the following example illustrating the same.

Example 1

Iron wire was passed through a metallizing gun as described and impinged upon a curved baffle element having a curvature of about 75°. The baffle element was cooled and at a temperature of about 200° F. The resulting iron spheres were collected and analyzed. The particle size distribution was as follows:

| Micron Size | Per Cent |
|---|---|
| 0–20 | 0.2 |
| 20–40 | 2.2 |
| 40–80 | 10.6 |
| 80–120 | 87 |

Prior to the analysis, slag was removed and the above particle size distribution of spheres represents approximately 90% recovery based upon the amount of iron wire used. The spheres were subjected to microscopic examination and to X-rays analysis which disclosed them to be hollow spheres and to be of a substantially crystalline structure of $Fe_3O_4$. The bulk density was about 2.48.

From the above data it is apparent that a large recovery (90%) was made of the iron wire and that the resulting hollow microspheres have a substantially uniform particle size distribution in the range from about 80 to 120 microns. This is extremely desirable when it is necessary to manufacture catalyst particles for utilization in fluid operations.

Example 2

Hollow iron microsphere catalysts containing 5% potassium fluoride, prepared in accordance with our process, were employed in various operations for the synthesis of hydrocarbons. The results of these operations are summarized as follows:

|  | Operation 1 | Operation 2 | Operation 3 |
|---|---|---|---|
| Temperature, °F | 600 | 600 | 595 |
| Feed, Hydrogen to CO ratio | 1.08 | 1.1 | 1.16 |
| Yields [1] | 123 | 120 | 121 |

[1] Cc. of hydrocarbons having four carbon atoms in the molecule and higher boiling constituent per cubic meter of hydrogen and carbon monoxide consumed.

Example 3

A catalyst comprising iron microspheres (oxidized 75%) and containing 2½% of a potassium carbonate promoter was prepared in accordance with our process. This catalyst was employed in a synthesis operation with the results as follows:

| | |
|---|---|
| Temperature, °F | 600 |
| Feed, $H_2$/CO ratio | 1.17 |
| Gas contraction, per cent | 57 |
| Yields, collected: | |
| Oil, cc./m.3 $H_2$+CO fed | 131 |
| $H_2O$, cc./m.3 $H_2$+CO fed | 73 |

The process of our invention is not to be limited by any theory as to mode of operation but only in and by the following claims in which it is desired to claim all novelty insofar as the prior art permits.

We claim:

1. A process for the preparation of alkali metal salt-promoted hydrocarbon synthesis catalyst comprising hollow metal microspheres containing an oxide of metal selected from the group consisting of iron cobalt and nickel, which comprises heating a wire or rod of said relatively pure metal to a temperature of about 2000°–4000° F., causing a moving stream of said metal to impinge upon a convex baffle disposed in the path of said stream and in an oxidizing atmosphere and further maintained at a temperature of from about 100°–300° F., whereby the stream of molten metal is formed into hollow microspheres having a particle size predominantly within the range of from about 40 to about 120 microns, recovering said particles in solidified form, and thereafter adding an alkali metal salt promoter to said particles.

2. A method set forth in claim 1 in which the metal is iron and which iron is recovered in the process in the form of microspheres and chemically consisting of the oxide of iron represented by the formula $Fe_3O_4$.

RHEA N. WATTS.
WILLIAM E. SPICER.

REFERENCES CITED

The following references are of record in the file of this patent:

UNITED STATES PATENTS

| Number | Name | Date |
|---|---|---|
| 721,293 | Fuchs | Feb. 24, 1903 |
| 1,051,844 | Passow | Jan. 28, 1913 |
| 1,695,041 | Elmen | Dec. 11, 1928 |
| 2,070,134 | Keyes | Feb. 9, 1937 |
| 2,157,498 | Reinecke et al. | May 9, 1939 |
| 2,365,720 | Neighbors | Dec. 26, 1944 |
| 2,449,071 | Hawk et al. | Sept. 14, 1948 |
| 2,488,150 | Walden et al. | Nov. 15, 1949 |